US008002628B2

(12) United States Patent
Tedsen et al.

(10) Patent No.: US 8,002,628 B2

(45) Date of Patent: Aug. 23, 2011

(54) MOVING REEL SYMBOLS ON REEL-BASED GAMING MACHINES

(75) Inventors: Kirk A. Tedsen, Reno, NV (US); Gene A. Spoor, Wadsworth, NV (US); Keith S. Murray, Beckworth, CA (US)

(73) Assignee: IGT, Reno, NV (US)

( * ) Notice: Subject to any disclaimer, the term of this patent is extended or adjusted under 35 U.S.C. 154(b) by 951 days.

(21) Appl. No.: 11/940,172

(22) Filed: Nov. 14, 2007

(65) Prior Publication Data

US 2008/0064485 A1 Mar. 13, 2008

(51) Int. Cl.
*G06F 17/00* (2006.01)

(52) U.S. Cl. .......................................................... 463/20

(58) Field of Classification Search ............... 463/16–25
See application file for complete search history.

(56) References Cited

U.S. PATENT DOCUMENTS

| | | | | |
|---|---|---|---|---|
| 5,580,055 | A | 12/1996 | Hagiwara | |
| 5,896,230 | A | 4/1999 | Goggins | |
| 5,971,271 | A | 10/1999 | Wynn et al. | |
| 6,135,884 | A | 10/2000 | Hedrick et al. | |
| 6,251,014 | B1 | 6/2001 | Stockdale et al. | |
| 6,503,147 | B1 | 1/2003 | Stockdale et al. | |
| 7,654,899 | B2 * | 2/2010 | Durham et al. | 463/30 |
| 2004/0192430 | A1 | 9/2004 | Burak et al. | |
| 2005/0054422 | A1 | 3/2005 | Rothkranz et al. | |
| 2006/0281525 | A1 * | 12/2006 | Borissov | 463/20 |
| 2008/0004104 | A1 * | 1/2008 | Durham et al. | 463/20 |
| 2008/0039198 | A1 * | 2/2008 | Seelig et al. | 463/31 |
| 2008/0113755 | A1 * | 5/2008 | Rasmussen et al. | 463/20 |
| 2009/0131150 | A1 * | 5/2009 | Iverson et al. | 463/20 |
| 2009/0137311 | A1 * | 5/2009 | Iverson et al. | 463/20 |

OTHER PUBLICATIONS

Office Action from prior U.S. Appl. No. 10/936,852, dated Aug. 9, 2006.

Final Office Action from prior U.S. Appl. No. 10/936,852, dated Mar. 7, 2007.

Office Action from prior U.S. Appl. No. 10/936,852, dated Sep. 10, 2007.

Notice of Allowance and Notice of Allowability from U.S. Appl. No. 10/936,852, dated Oct. 5, 2007.

* cited by examiner

*Primary Examiner* — Ronald Laneau

(74) *Attorney, Agent, or Firm* — Weaver Austin Villeneuve and Sampson LLP

(57) ABSTRACT

Gaming machines, systems and methods that present reel-based games are disclosed. Reel symbols can move or appear to move from one gaming reel to another gaming reel. Such reel symbols may include lenticular images, such as those that are implemented onto a medium via a lenticular process, whereby the medium is then applied to various gaming machine reels so that a viewer can perceive effects such as motion and depth. The medium can be a multi-image sheet containing regions of overlapping images where different images are visually predominant at different viewing angles, and the movable base can comprise a gaming reel. Multiple gaming reels can be used, and can be adapted to rotate in any direction.

20 Claims, 8 Drawing Sheets

MOVING REEL SYMBOLS ON REEL-BASED GAMING MACHINES

CROSS REFERENCE TO RELATED APPLICATION

This application claims priority to co-pending and commonly owned U.S. patent application Ser. No. 10/936,852, filed on Sep. 8, 2004, which is incorporated herein by reference in its entirety and for all purposes.

TECHNICAL FIELD

The present invention relates generally to gaming machines and systems, and more specifically to the provision of visual images and displays within and about gaming machines and systems.

BACKGROUND

Casinos and other forms of gaming comprise a growing multi-billion dollar industry wherein floor space is at a premium, such that newer, more popular and increasingly sophisticated games and machines are preferred over older and less popular ones. For example, the casino and gaming industries have experienced a marked shift over the past few decades not only from the prevalence of table games to gaming machines, but also from the use of fully mechanical gaming machines to electronic and microprocessor based gaming machines. In a typical gaming machine, such as a video poker or slot machine, a game play is first initiated through a player wager of money or credit, whereupon the gaming machine determines a game outcome, presents the game outcome to the player and then potentially dispenses an award of some type, including a monetary award, depending on the game outcome. Although this process is generally true for both mechanical and electronic gaming machines, electronic machines tend to be more popular with players and thus more lucrative for casinos for a number of reasons, such as increased game varieties, more attractive and dynamic presentations and the ability to award larger jackpots.

Electronic and microprocessor based gaming machines can include a number of hardware and software components to provide a wide variety of game types and game playing capabilities, with such hardware and software components being generally well known in the art. A typical electronic gaming machine comprises a central processing unit ("CPU") or master gaming controller ("MGC") that controls various combinations of hardware and software devices and components that encourage game play, allow a player to play a game on the gaming machine and control payouts and other awards. Software components can include, for example, boot and initialization routines, various game play programs and subroutines, credit and payout routines, image and audio generation programs, various component modules and a random number generator, among others. Exemplary hardware devices can include bill validators, coin acceptors, card readers, keypads, buttons, levers, touch screens, coin hoppers, ticket printers, player tracking units and the like.

In addition, each gaming machine can have various audio and visual display components that can include, for example, speakers, display panels, belly and top glasses, exterior cabinet artwork, lights, and top box dioramas, as well as any number of video displays of various types to show game play and other assorted information, with such video display types including, for example, a cathode ray tube ("CRT"), a liquid crystal display ("LCD"), a light emitting diode ("LED"), a flat panel display and a plasma display, among others. Apparatuses and methods for providing displays in gaming machines and/or within a casino are generally well known, and instances of such apparatuses and methods can be found in, for example, U.S. Pat. Nos. 5,971,271; 6,135,884; 6,251,014; and 6,503,147, all of which are incorporated herein by reference in their entirety and for all purposes. Such video displays can be used to simulate mechanical gaming reels, whereby all elements of the displayed wheels are controlled and displayed electronically. Alternatively, physical gaming reels may be displayed behind a main display glass or other like viewing element, with the rotation and positioning of these physically present gaming reels being determined and controlled electronically, as is known in the art.

Various methods of gaining and maintaining interest in game play include designing and providing gaming machines with intriguing and different themes, game types, artwork, visual displays, sounds and the like. One attractive feature for many players is the use of three dimensional graphics or displays in a gaming machine, particularly where such displays are integrated with game play and/or other pertinent presentations to a game player. Such displays and presentations tend to be relatively dramatic, appealing and eye catching for players, prospective players and passers by alike. As in the case of many image, video and graphical displays in the electronic age, appealing yet complex three dimensional renderings can be programmed for generation and display by many different advanced processors and accompanying devices. Unfortunately, many forms of three dimensional graphics or renderings are extremely demanding in terms of the levels of electronic storage space and processing power required. Accordingly, most gaming machines do not provide such complex three dimensional displays, and those that do tend to be expensive and more prone to problems or display glitches when compared to typical electronic gaming machines.

While existing systems and methods for displaying visual images within a gaming machine have been satisfactory in the past, improvements and better systems and methods are usually welcomed and encouraged. In particular, it is desirable that such systems and methods involve the implementation of inexpensive yet appealing visual presentations, such as three dimensional images and renderings.

SUMMARY

It is an advantage of the present invention to provide improved systems and methods for displaying inexpensive yet effective three dimensional visual images and video in a gaming machine or gaming system. This is accomplished by designing and applying static images to a flat medium via a lenticular process or other similar process, and then applying that flat medium to various stationary and moving surfaces within and about a gaming machine such that depth, motion and other effects are perceived by a player or viewer of the images.

According to one embodiment of the present invention, a provided method involves creating a gaming machine adapted for accepting a wager, playing a game based on the wager and granting a payout based on a game result. Specific steps of this method can include developing a game theme for the gaming machine, designing artwork including visual images for the gaming machine based on this game theme, implementing at least two of these visual images onto a physical medium via a lenticular process to form a multi-image sheet with lenticular layers, attaching at least a portion of this multi-image sheet to a movable base, and installing the movable base to the gaming machine. The multi-image sheet is formed such that it contains one or more regions of overlapping images where one image is visually predominant at one viewing angle while another overlapping image is visually predominant at a different viewing angle. Also, the movable base is adapted to be moved from one position to another position, with such movement enabling an unmoving viewer at a stationary location outside the gaming machine to view the one image at the one viewing angle and the other overlapping image at the other viewing angle.

According to another embodiment of the present invention, the provided method involves developing a gaming machine, with specific method steps including designing artwork including visual images for the gaming machine, generating one or more digital files containing some or all of these designed visual images, previewing at least one of these digital files, modeling these designed visual images during a computer assisted simulation to estimate the appearance of the visual images after a real application, and then implementing these visual images to a medium, attaching the medium to a movable base and installing the movable base to a gaming machine, as in the above embodiment. In both this and the previous embodiment, the multi-image sheet or sheets can be created such that they comprise a plurality of images that appear to be three dimensional in nature when viewed without movement from a single stationary location and viewing angle. Alternatively or in addition, the multi-image sheet or sheets can have a plurality of images that appear to move and/or morph as the viewing angle to the sheet changes.

Further details of either of these foregoing embodiments can include the specific lenticular process used, which might involve lithographic, photographic, digital or silkscreen processes. The number of lenticular layers created may also vary, with as few as two, preferably five, or as many as a dozen or more layers. Also, the physical medium can be sufficiently flexible such that it can be conformed to a substantially curved surface, such as a gaming reel or other cylindrical and/or rotatable base. In such instances, the visual images might comprise reel symbols, and the multi-image sheet might comprise one or more gaming reel strips. These visual images, as well the positions of the gaming reel, might also comprise reel stops.

In some variations of the foregoing embodiments, the movable base can be installed within or about a top box of the gaming machine, while in other variations, the movable base is installed in a main cabinet of the gaming machine. In these or other specific embodiments, a plurality of movable bases having these overlapping visual images can be installed into a single gaming machine or device. This plurality of movable bases can all be gaming machine reels, such as those used for determining main game or bonus game outcomes. In these and other cases, the movement of one or more movable bases from one position to another can be rotational movement. In these or other specific embodiments, the movable base or bases can be cylindrical, and these cylindrical bases or reels may rotate about an axis that is substantially parallel to or perpendicular to a vertical axis of the gaming machine.

In another specific variations, this flexible medium is plastic, and when attached to the movable base is disposed between two additional layers of a different medium, such as glass. In another specific embodiment, at least a portion of the movable base is transparent or translucent. At least a portion of one or more of the visual images attached to the movable base may also be transparent or translucent. In such an instance, the provided method might also involve installing a backlight behind the transparent or translucent portion of the movable base, such that one or more or the transparent or translucent images attached to the movable base can be illuminated by light passing therethrough.

In yet other specific variations of the presented embodiments, at least one substantially homogenous transparent or translucent region or window is formed in the multi-image sheet. Of course, this may involve multiples of such regions or windows in multiple sheets and/or placement of such onto multiple movable bases or gaming machine reels. Such regions or windows are oriented to permit information from the gaming machine to be displayed therethrough, which information might include displays from a spectrometer credit meter, jackpot meter, or any other display device. In one embodiment, an actual window is formed by using a laser to cut away a transparent or translucent region within the multi-image sheet or a portion thereof.

In still other variations of the foregoing embodiments, the provided methods can include programming the gaming machine to utilize the movable base and attached multi-image sheet portion as part of an attract mode activity during a period of gaming mode inactivity. Alternatively, or in addition to this variation, the provided method can involve programming the gaming machine to use the movable base and attached multi-image sheet portion as part of a bonus game activity. In the event that multiple movable bases and attached multi-image sheet portions are used, this can also involve the play of a game or bonus game where the right combination of movable base positions and images displays can result in a win for a player.

According to yet another embodiment of the present invention, a gaming machine adapted for accepting a wager, playing a game based on the wager and granting a payout based on the result of the game is provided. This gaming machine includes an exterior housing arranged to contain various internal gaming machine components, a master gaming controller in communication with at least one of these internal gaming machine components and adapted to control one or more game aspects, one or more gaming reels having at least one attached multi-image reel strip and adapted to be controlled at least in part by the master gaming controller, and a back light behind a transparent or translucent portion of one or more gaming reels. Various features and specific embodiments disclosed above can be implemented on this provided gaming machine in various combinations.

For example, visual images can be implemented via a multi-layered lenticular process onto at least one gaming reel to form one or more regions of overlapping images, such that a first image at a given region is visually predominant at one viewing angle while a second overlapping image at that region is visually predominant at another viewing angle. In addition, at least one gaming reel is adapted to be moved from one position to another position to enable a viewer at a stationary location outside the gaming machine to view the first image at one viewing angle and the second overlapping image at another viewing angle without having to move. Furthermore, the given region can comprises a reel stop, at least one of the visual images can comprise a reel symbol, at least a portion of one or more gaming reels can be transparent or translucent, and at least a portion of one or more images on a multi-image reel strip is also transparent or translucent. In addition, the gaming machine can be adapted such that use of the backlight causes said one or more of the transparent or translucent images to be illuminated by light passing therethrough. Also, wherein at least one gaming reels can be adapted to rotate about an axis that is substantially parallel or horizontal to the vertical axis of the gaming machine.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing visual images and displays within a gaming machine or gaming system. These drawings in no way limit any changes in form and detail that may be made to the invention by one skilled in the art without departing from the spirit and scope of the invention.

DETAILED DESCRIPTION

Figure 1:
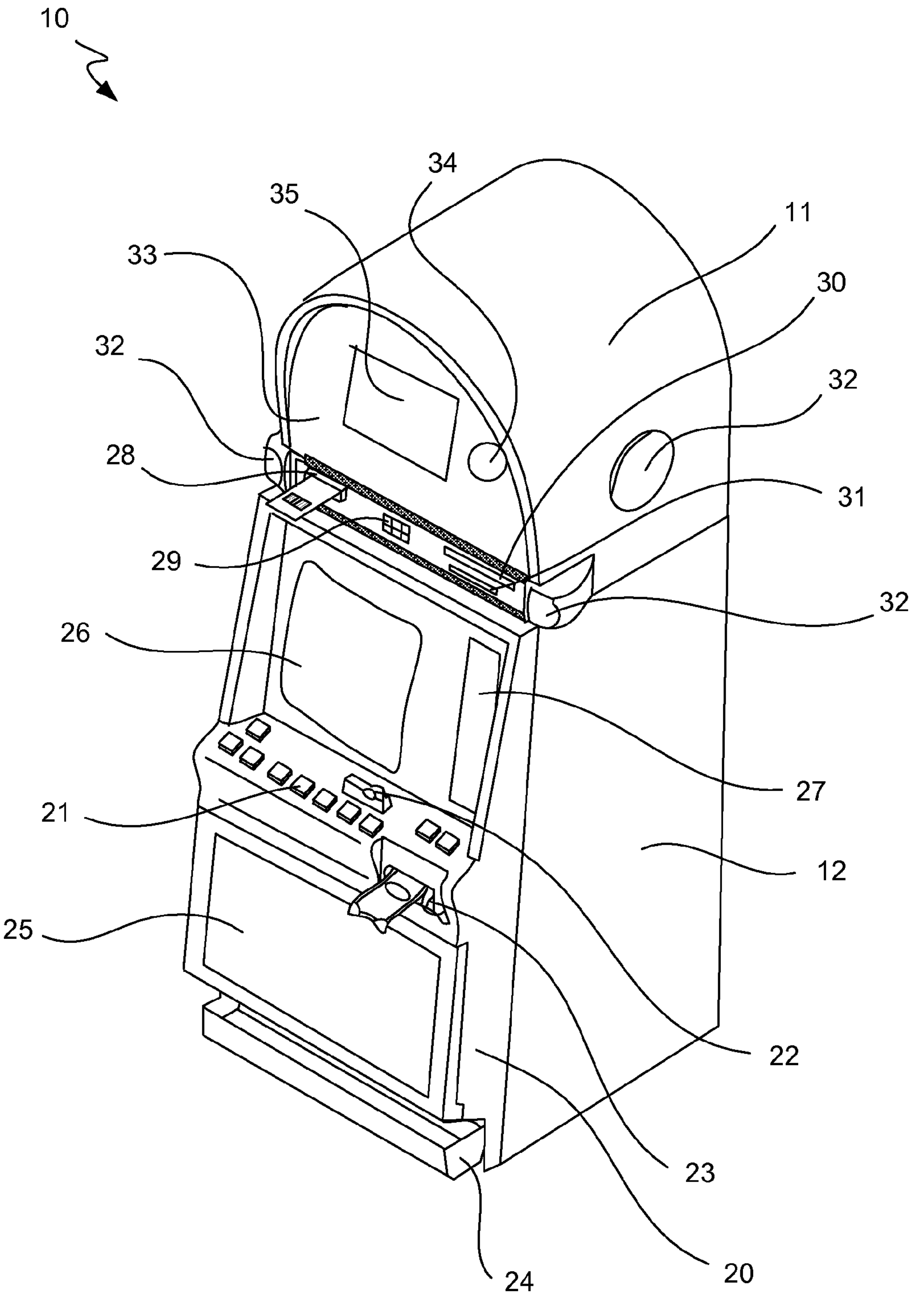
FIG. 1 illustrates in perspective view an exemplary gaming machine.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

One advantage of the present invention is the provision of inexpensive yet effective visual images and displays. Another advantage of the systems and methods disclosed herein is the ability to provide displays having apparent three-dimensional depth and movement from what are essentially two-dimensional and static images. This advantageously permits a gaming machine maker or operator to provide gaming machine displays and images that appear to be complex and expensive, despite the fact that these images are actually relatively simple and inexpensive. These and other advantages are primarily accomplished through the use of sheets or other mediums that have had a plurality of images placed thereon via a lenticular or similar process.

As an introduction to the various embodiments described herein, two very specific examples under particular implementations of the present invention will now be provided. It will be readily appreciated that the following examples are picked from a potentially infinite number of possibilities that may occur under the present invention, such that these examples are not limiting in any way. According to a first specific example, a given player passes by an unattended gaming machine on a casino floor and is attracted to various visual and audio displays of that gaming machine, which is in an "attract mode." These visual and audio displays include a cylindrical top box diorama having three horizontally rotating gaming reels. Each of these gaming reels is translucent in nature, each is backlit, and each is in motion as the player passes by the gaming machine and stops to get a better look.

Each of these gaming reels also contains a number of reel stops, and many of these reel stops include reel symbols, with may reel symbols having several overlapping images superimposed atop one another via a lenticular process. At any given reel stop having a reel symbol with multiple overlapping images, each such image is somewhat different than every other image within that reel symbol. At a particular reel stop and reel symbol, there are three different images of a fish and fishhook, with the first image depicting a fish approaching the fishhook, the second image depicting that fish closer to the fishhook and about to bite it, and the third image depicting the fish as caught with the fishhook in its mouth. The effect of the rotating motion of the gaming reel causes an eye-catching effect to the player as he views this reel stop with a reel symbol having three different overlapping images imposed via a lenticular process. As the player stands relatively motionless in a single location, it appears as though the same fish approaches the fishhook, bites onto it, and is then caught with the hook in his mouth, due to the changing viewing angles of this reel stop and reel symbol as the reel rotates. Since there are several other similar reel stops having the same or similar reel symbols, the player also observes this same effect several times as the three gaming reels rotate simultaneously while the gaming machine is in its "attract mode." Other such multi-image and "motion effect" reel symbols include other fish getting caught, other fish getting away, empty fishhooks bobbing underwater, and fishing lines weaving back and forth underwater.

Being intrigued, the player then decides to play the gaming machine. After he inserts an appropriate amount of money and initiates game play, the gaming machine enters its regular "gaming mode" and accepts wagers, plays games based on those wagers, and grants monetary awards depending upon the outcomes of those games. The previous "attract mode" displays and activity in the top box as described above cease during this regular "gaming mode." After several regular game plays, the player earns a bonus game play as an award for a regular game outcome. At this point, various visual and audio displays indicative of a gaming machine "bonus mode" are activated, and the player is allowed to play a bonus game involving the gaming reels in the top box diorama. The bonus game is initiated, whereupon the three gaming reels in the top box begin to rotate horizontally, giving the appearance of several moving fish, fishhooks and fishing lines underwater beneath a fishing boat at the water surface. After a brief period of time, the three gaming reels all stop in succession, at which point it is determined that the configuration of these reels does not produce a winner. The bonus game is then over, and the gaming machine reverts from its bonus mode back to its regular gaming mode. Several games later, the player wins another bonus game play. After the play of this bonus game, the three stopped gaming reels align such that a continuous fishing line appears to extend through the top two reels, with a fish caught on a fishhook appearing at the end of this fishing line on the bottom reel. The player is then awarded a bonus monetary prize based on this winning configuration of the three top box gaming reels in this bonus game.

According to a second specific example, a development team at a gaming machine manufacturer is tasked with creating, developing and producing a new line of gaming machines. This team develops a horse racing game theme and a gaming machine title of "Thoroughbred Stakes" for this new line of gaming machines. Team members design several dozen specific visual images for this game theme, including racetracks, starting gates, finish lines, grandstands, and jockeys and racing horses in various running positions. Team members also generate several digital files of these visual images in electronic format, such that the images can be more conveniently duplicated, transferred, reviewed, manipulated, refined, compared and selected, among other reasons. Various team members preview these digital files and model various selected visual images in a computer assisted simulation to determine which images are best overlapped with which other images and in what manner to produce an attractive set of "moving" images when applied to a set of rotating gaming reels. The final selected and refined visual images are then implemented onto a plastic sheet in five separate layers via a lithographic lenticular process to create a prototype multi-image sheet of reel strips with five overlapping images per reel symbol.

This prototype multi-image sheet is then separated into individual reel strips, and windows are cut into several reel strips by laser. Each of three reel strips is then attached to an individual gaming reel with VHB tape, and these three gaming reels are installed into a prototype gaming machine in a standard vertical orientation, such that all three rotate about an axis that is substantially horizontal with respect to the gaming machine in its normal upright position. In particular, one gaming reel with a window cut therein is implemented onto a specialized gaming reel having a variable bonus counter display that can be seen through this window cutout. As in the foregoing specific example, many reel stops on the reels of this gaming machine form regions of overlapping images forming a given reel symbol, such that different images within that reel symbol are visually predominant at different viewing angles. Given that these multi-image reel symbols involve five different overlapping images, there are five different primary viewing angles for the five different images in a given reel symbol, such that a five frame sequence of "motion" or animation is perceived for each reel symbol created in this manner by a stationary viewer as the gaming reel displaying that reel symbol rotates. Various individual reel symbols having five different overlapping images include different views or "frames" for several different horses, various racetrack segments or sections, a starting gate, a finish line, and various grandstand views.

The intent of the overall design is to present various horses racing each other along a set racetrack with an active grandstand watching while the gaming reels spin. Winning or losing outcomes of games played on this gaming machine are determined based upon relative events that appear to occur during the reel spinning process and/or the final configuration of the stopped reels when the game ends. The rotational speed of the gaming reels in this gaming machine is reduced to a speed that is slower than a typical gaming reel rotational speed, since it is desirable for a human viewer to perceive these reel symbols as animated or "moving" while the reels are actually rotating. Test runs and observations are made on this prototype to survey whether the modeling was sufficiently accurate, whether the final product works well, and whether further visual image designing, refining and/or modeling may be desired. It is determined that the prototype is a success, whereupon the electronic image files are organized into a final certified format and are duplicated, and various templates and other devices are created to facilitate the mass production of identical or substantially similar multi-image sheets, gaming reel strips and gaming machines.

Again, these forgoing specific examples illustrate only two of the myriad possible outcomes and arrangements under the disclosed systems and methods for providing visual images and displays within and about gaming machines and gaming environments. The following detailed description will now provide for other possibilities and implementations of these and other such systems and methods at varying levels. In reviewing the following description, it should be remembered that not all implementations of the inventive systems and methods disclosed herein must used in the specific manner or application as described, and that details under such systems and establishments are provided only for purposes of illustration.

Referring first to FIG. 1, an exemplary gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional electronically controlled video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may also contain a bill or ticket validator 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional electronically controlled video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Other features and functions may also be used in association with gaming machine 10, and it is specifically contemplated that the present invention can be used in conjunction with such a gaming machine or device that might encompass any or all such additional types of features and functions. Gaming machines such as these and other variations and types are made by many manufacturers, such as, for example, IGT of Reno, Nev.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general purpose computers.

Figure 2:
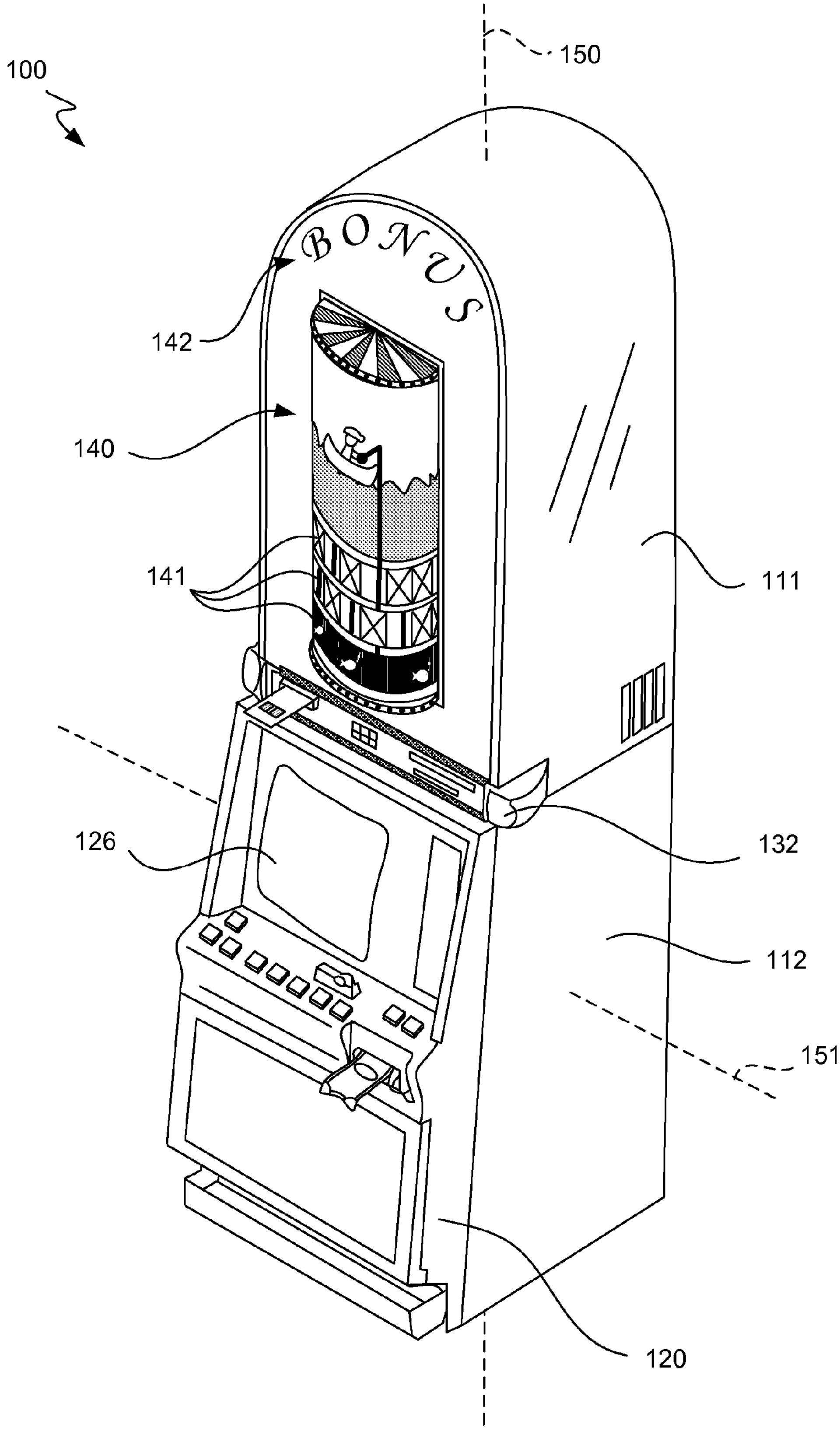
FIG. 2 illustrates in perspective view an alternative gaming machine according to one embodiment of the present invention.

Moving to FIG. 2, an alternative gaming machine according to one embodiment of the present invention is similarly illustrated in perspective view. Like gaming machine 10 above, gaming machine 100 also includes a top box 111 and a main cabinet 112, one or both of which can comprise an exterior housing arranged to contain a number of internal gaming machine components. Many features can also be the same or similar to corresponding features in gaming machine 10, such as a main door 120, a primary video display monitor 126 and one or more speakers 132. As can be seen, however, top box 111 is somewhat different than the top box of exemplary gaming machine 10 above. Top box 111 is comparatively tall, and contains an active and protruding cylindrically shaped diorama 140. This diorama includes a fishing scene and three horizontally rotating gaming reels 141. By horizontally rotating, it is meant that these three gaming reels 141 rotate about an axis 150 that is substantially vertical with respect to an ordinary upright position of the gaming machine 100. As is generally known in the art, many standard slot machines have gaming reels that rotate about an axis 151 that is substantially horizontal with respect to an ordinary upright position of the gaming machine.

In addition to this top box diorama 140, top box 111 also comprises a bonus indicator or light 142, which can be used to indicate whenever the gaming machine enters a bonus mode. Although the depicted indicator is a simple "BONUS" sign, it will be readily appreciated that this indicator can be a light, a series of lights, an arrow or other pointer, and/or any other convenient bonus indicator. As shown in the particular embodiment illustrated, top box 111 contains various components to facilitate the play of a bonus game associated with a main game played on gaming machine 100. In one embodiment, an outcome or series of outcomes on a main game or games played on gaming machine 100 can result in the ability of a player to play in a bonus game on the top box 111 of the gaming machine. Other ways of accessing such a bonus game might also be possible, as desired by a given gaming operator. In one embodiment, the play of the bonus game involves a spin of the three horizontally rotating gaming reels 141 within top box diorama 140. Further details of these three gaming reels are provided with respect to the detailed figure below.

Figure 3:
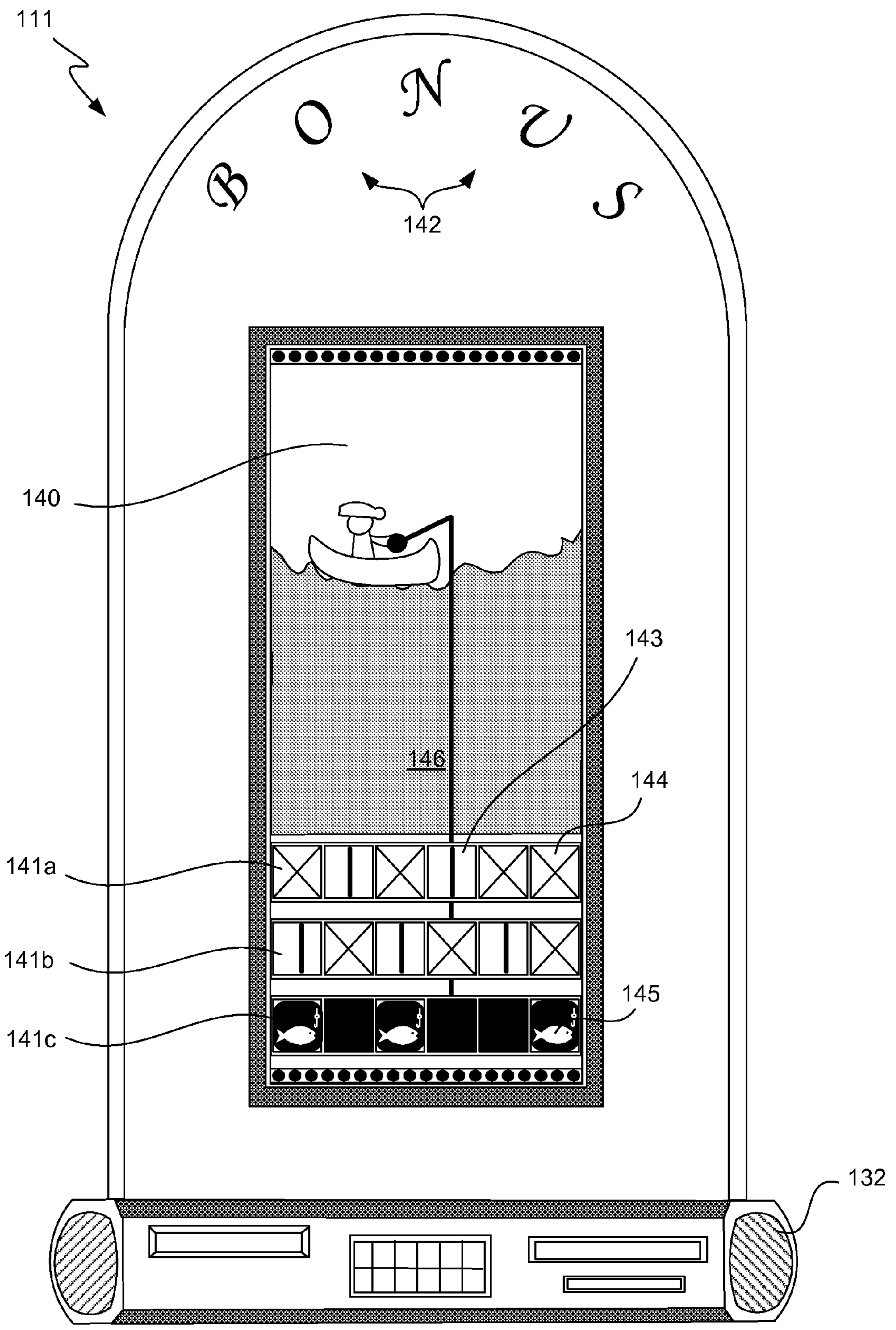
FIG. 3 illustrates in frontal elevation view an enlarged version of the top box of the alternative gaming machine shown in FIG. 2.

Continuing on to FIG. 3, an enlarged version of the top box 111 of gaming machine 100 is shown in frontal elevation view. As above, top box 111 is shown to have a bonus indicator 142 and an active protruding diorama 140 with various game elements therein. In particular, diorama 140 contains a fishing scene made up of three gaming reels 141*a*, 141*b*, 141*c*, each of which has various reel stops and/or reel symbols, such as a fishing line 143, an "X" or blank region 144, and a fish 145, with other such reel stops or reel symbols also being possible. Also, a background of a general fishing environment 146 resides above the gaming reels 141, which general environment includes a body of water, a boat, a fisherman, a fishing line, and a rod and reel. In one embodiment, this background or general fishing environment 146 can remain static at all times. In another embodiment, this background might also be movable, such as to shift back and forth while the gaming reels 141 are rotating. Of course, such movement might take place during an "attract mode" as well as during play within a "bonus mode" of the gaming machine. This background 146 might also be illuminated or backlit by one or more lights, as desired.

Of particular interest are many of the reel symbols 143, 144, 145 on the three gaming reels 141*a*, 141*b*, 141*c* within the diorama 140 of top box 111. Many or all of these reel symbols can be designed such that a player or viewer of the gaming machine can perceive three-dimensional features such as depth and/or motion with the image or images of a single reel symbol. One way to accomplish this objective is to provide multiple visual images within a single reel symbol or reel stop, with some or all of these multiple visual images also overlapping one another. In a preferred embodiment, these multiple and overlapping visual images can be arranged such that each image is predominant and primarily viewable from a given viewing angle or range of viewing angles. In some embodiments, it might be preferable to implement these images such that one or more images are barely viewable or not viewable at all at many viewing angles, such that only one or a limited number of images are actually seen at a given viewing angle. In this manner, a series of visual images within one reel symbol can be perceived in a sequence as a gaming reel containing that reel symbol rotates and thereby continuously changes the viewing angle of the reel symbol to a stationary viewer or player outside the gaming machine.

One or more of the foregoing effects can be accomplished in a variety of ways, such as to overlap separate transparent or translucent mediums with single images on each by placing them all onto one location to form a single multi-image reel symbol, for example. One particularly preferred method of creating such multi-image reel symbols, however, is to incorporate all visual images for each of a number of reel symbols onto a single medium via a lenticular or other similar process. The single medium used to create these multi-image reel symbols can be a sheet of plastic, glass, or other suitable material, and is preferably transparent or translucent, such that some amount of light can pass therethrough. Such a lenticular process might involve any of a number of types, such as those involving lithographic, photographic, digital and silkscreen lenticular processes. In one embodiment, a lithographic lenticular process is used, since higher quality images are typically produced and reproduced quite readily by lithographic techniques. Although lithographic processes tend to be more expensive than other lenticular processes, the overall cost for producing visual images via such a process is substantially lower than the costs involved in purchasing and operating a more complex display means, such as a video screen, for example.

Lenticular processes, and in particular lithographic lenticular processes, are generally well known, and are used to create a variety of visual items, such as those found on trading cards, children's toys, souvenir drinking cups, and elsewhere. Specific details of such processes are well known, and can be found in numerous places, such as, for example, the History and Guide Book to Lenticular Technology by Frank X. Didik, and the Internet web site at www.depthography.com/times.html, among others. Various commercial entities provide lenticular products, such as, for example, Extreme Vision of National Graphics, Inc. of Brookfield, Wis., and Virtual Graphics, Inc. of San Bernardino, Calif. Other entities in this field also include Lenticular Imaging, Big 3D.com, Micro lens Technology and Dynamic Images, among others. It is particularly contemplated that any or all such lenticular processes from these or other suitable parties can be used in conjunction with the present invention to create overlapping visual images in a manner such that depth, movement and/or other attractive or eye-catching features can be achieved.

Such visual images might be applied to a flat medium that is then installed into a single static location within or about the gaming machine, such as to create appealing artwork on the gaming machine. Alternatively, or in addition, such overlapping visual images might be applied to a pliable medium that can then be attached to a movable base, such that different overlapping images can be seen at different viewing angles without having to move the viewer, due to movement of the applied movable base. Such a movable base can be an oscillating sign or other attract mode feature, one or more gaming reels or other rotatable wheels, or any of a number of other items, as desired by a gaming machine designer.

In one preferred embodiment, a lithographic lenticular process is used to implement visual images into many multi-image reel symbols onto one or more pliable plastic sheets, with these sheets then being separable into individual reel strips that can be attached to individual gaming reels for installation into gaming machines, as will be readily appreciated. Any number of lenticular "layers" or levels of images can be made in a given sheet, from as few as two to as many as a dozen or more. However, with more layers comes more complexity in the manufacturing process, along with increased chances for complexity, confusion and ineffectiveness on viewers where multiple overlapping images might all be seen at one time. In one embodiment, anywhere from two and eight lenticular layers can be used with relative ease and confidence. In one particular embodiment, it is contemplated that the use of five lenticular layers is an appropriate amount in the present invention. Five layers allows for the provision of five overlapping images in one reel symbol, which permits a significant amount of frames for animation and/or depth purposes. At the same time, five layers does not create an overly expensive lenticular process, is not likely to overwhelm or confuse a viewer with too many images, and is not likely to result in many overlapping images being seen simultaneously at a single viewing angle when in operation. Of course, more or fewer lenticular layers may also be used as desired, given the levels of complexity, manufacturing quality and cost that a manufacturer might be willing to provide or tolerate.

Figure 4:
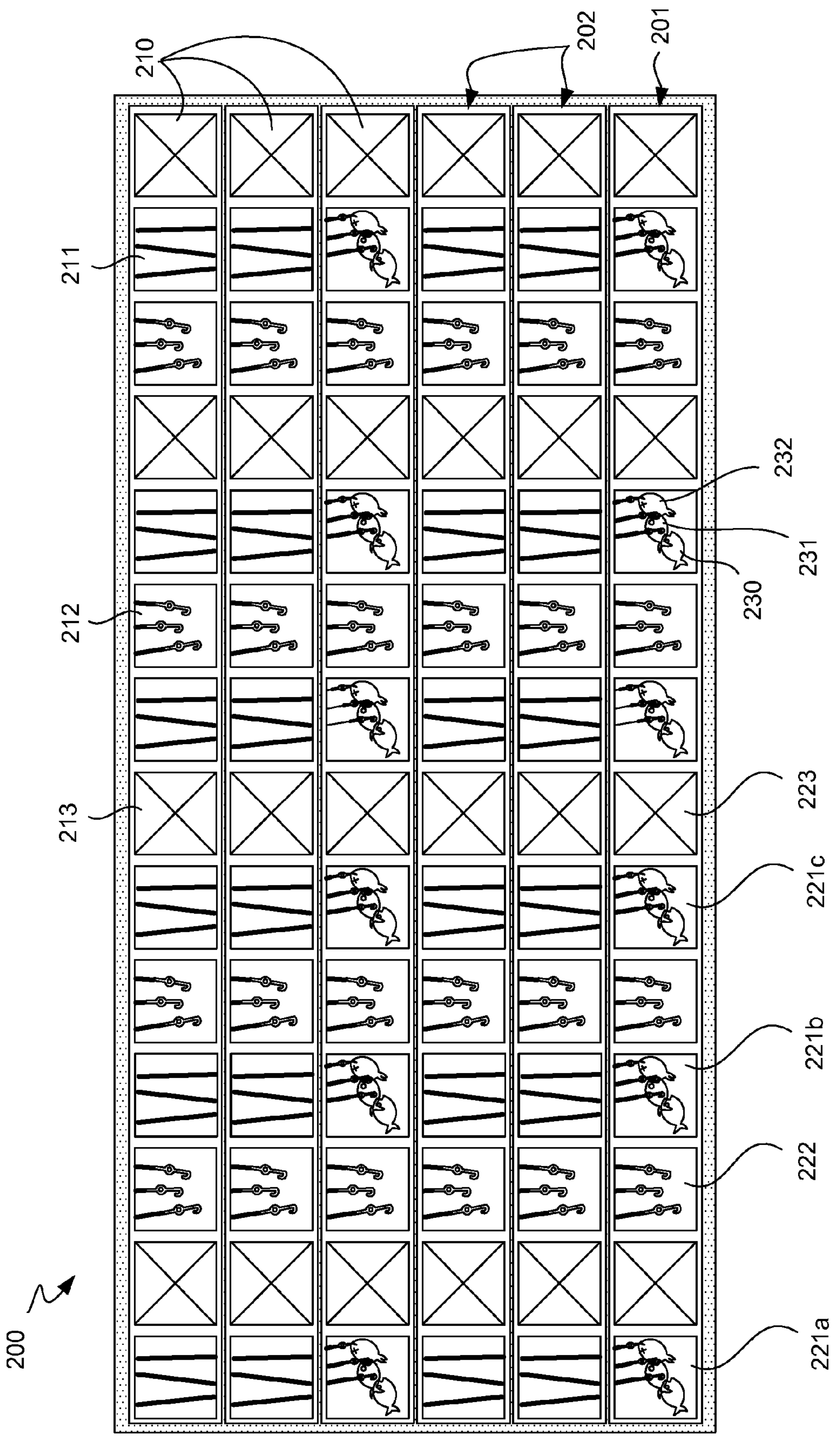
FIG. 4 illustrates in top plan view a multi-image sheet comprising a plurality of reel strips according to one embodiment of the present invention.

Turning now to FIG. 4, a multi-image sheet comprising a plurality of reel strips according to one embodiment of the present invention is illustrates in top plan view. Multi-image sheet 200 is designed to provide reel strips for the top box gaming reels of gaming machine 100 and those of other like gaming machines, with this being a typical sheet that can be made via a lithographic lenticular process, or any other lenticular process. In this particular embodiment, sheet 200 contains three lithographic layers, although more or fewer layers can also be used, as noted above. Sheet 200 is designed such that it contains exactly six reel strips 201, 202, 210, each of which contain exactly fourteen reel symbols or reel stops, such as 211, 212, 213, 221*a,b,c*, 222, and 223. Of course, more or fewer reel symbols or stops can be used per reel for a particular design, as will be readily understood by those skilled in the art. Also, it will be readily understood that more or fewer reel strips might be created on a given multi-image sheet, as might be practical for manufacturing purposes.

As shown in this illustrative example, sheet 200 has been designed to have two full sets of reel strips, such that two gaming machines can be outfitted with the reel strips of this sheet during the manufacturing process. One full set of reel strips 201, 202 comprises the lower half of sheet 200, while the other set 210 comprises the upper half of the sheet. As will be readily appreciated, reel strip 201 corresponds to the lowest top box gaming reel 141*c* of gaming machine 100, while reel strips 202 both correspond to the other two top box gaming reels 141*a*, 141*b* of this previously illustrated gaming machine. As shown in FIG. 4, reel symbols or stops 211, 212 and 213 are found on the reel strips to be used for the upper two gaming reels 141*a*, 141*b*, while reel symbols or stops 221*a,b,c*, 222, and 223 are found on the reel strips to be used with the bottom gaming reel 141*c* of gaming machine 100. As can be seen, each reel strip contains multiples of the same reel symbols. As can also be seen, many of these reel symbols contain three different visual images. In the case of the fish reel symbols 221*a,b,c* and the like, each such reel symbol contains visual images 230, 231 and 232. It will be readily appreciated that these particular visual images and/or all other visual images from other reel symbols might not actually be viewable from the same viewing angle, such as the directly orthogonal "plan" view of FIG. 4. Rather, all visual images for all reel symbols are shown here for purposes of illustration only.

Reel symbol 211 depicts three different visual images or views of a fishing line, with such images giving the appearance of a fishing line "weaving" back and forth underwater when viewed in sequence while the applied gaming reel is rotating. Reel symbol 212 depicts three different visual images or views of empty fishhooks weaving or bobbing underwater when similarly viewed in sequence. Reel symbol 213 simply represents an "X" or a blank space on the reel strip. Such a "reel symbol" can exist for a reel stop where nothing or nothing significant is displayed at that stop. In one artistic embodiment, reel symbol or stop 213 might simply be shown as water and nothing more. Of course, other reel symbols might also be used on this first reel strip, with such symbols including, for example, other fish, old boots, tin cans, sharks or whatever other items or themes that a fishing game designer might devise. Such other reel symbols, as well as an artistic water only reel symbol, might also involve three separate visual images or views that similarly animate or appear to move.

Reel symbols 221*a,b,c* are all substantially similar and all depict three different visual images or views of a fish approaching and biting a fishhook, with such images giving the appearance of a fish being caught when viewed in sequence while the applied gaming reel is rotating. Reel symbol 222 is similar to reel symbol 212 in depicting three visual images or views of empty fishhooks, while reel symbol 223 is similar to reel symbol 213 in depicting an "X," a blank spot or the reel, or a similar insignificant "losing" reel symbol. Again, other reel symbols might also be used on this reel strip, as desired, and these other reel symbols might also involve a similarly animated or "moving" series of different visual images. Although gaming machine 100 depicts a bonus fishing game, any other theme or type of bonus game, main game or other game can be implemented, such that the actual artwork and images on multi-image sheet 200 could be virtually anything at all. Accordingly, the examples given herein under a "fishing" game theme are merely a small sampling of the numerous and virtually endless varieties of artwork, symbols and visual images that can be implemented onto this multi-image sheet in a similar lenticular fashion, as will be readily appreciated.

FIGS. 5A through 5E illustrate in frontal elevation view a simulated animation of successive views of one reel strip from the multi-image sheet of FIG. 4 as applied to a rotating reel according to one embodiment of the present invention. For purposes of illustration, simplistic black and white outline drawings of a three image sequence are provided herein, although it is specifically contemplated that more images and images of a higher quality and full color can be used as applied in an actual multi-image sheet or gaming reel strip. At each of FIGS. 5A through 5E, the reel strip 201 of FIG. 4 has been applied to a gaming reel 141*c* within a top box 111 of a gaming machine 100, all of which have been previously illustrated. This gaming reel 141*c* rotates from left to right as viewed in this illustration, and particular focus is made herein with respect to reel symbol 221*c* as it passes from left to right as viewed by a player or viewer standing in front of the gaming machine 100.

Figure 5A:
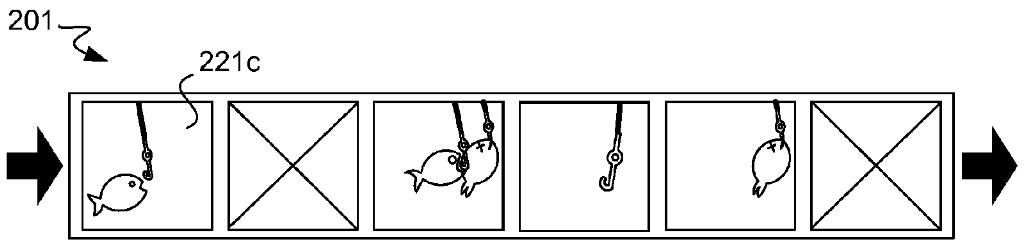
FIGS. 5A through 5E illustrate in frontal elevation view a simulated animation of successive views of one of the reel strips of FIG. 4 as applied to a rotating reel according to one embodiment of the present invention.

In a first animated scene shown in FIG. 5A, reel symbol 221*c* depicts one visual image of a fish that is approaching a fishhook, which visual image is identical or substantially similar to visual image 230. No other visual image in reel symbol 221*c* is visually predominant or seen here by a player or viewer located directly in front of the gaming machine, although faint views or traces of other images might be seen or noticed as with any multi-layer medium created by a lenticular process. As shown, reel symbol 221*c* has just entered the player viewable region of horizontally rotating gaming reel 141*c*, and is located at the far left of the player or viewer. Other reel symbols to the right of reel symbol 221*c* are also viewable, which reel symbols include those that are identical or similar to reel symbols 221, 222, and 223. There are shown five other reel symbols to the right of reel symbol 221*c*, and each of these other reel symbols has presumably passed to its present position from the far left as the gaming reel rotates from left to right. As can be seen in these other reel symbols, other visual images are more prevalent or dominant due to their different viewing angles with respect to the player or viewer directly in front of the gaming machine. In fact, the visual image 230 seen in reel symbol 221*c* is not predominant or cannot be seen at all in any other reel symbol at this juncture, since any other reel symbol that might contain this visual image is at a viewing angle that does not permit this visual image to be predominant or seen at all.

Figure 5B:
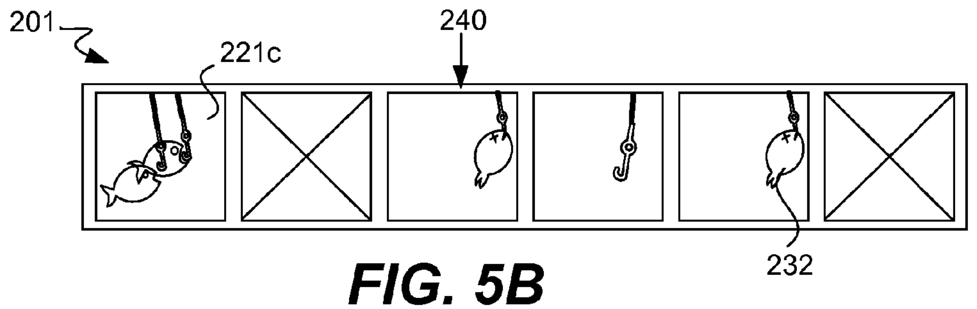

At a following animated scene shown in FIG. 5B, the reel 141*c* has rotated forward the length of one-half of a reel symbol. At this juncture, reel symbol 221*c* starts to depict a second visual image 231 of the same fish moved forward and about to bite on the fishhook. At the same time, the first visual image 230 of the fish approaching a fishhook is also visible, but is being phased out as the viewing angle continuously changes due to the rotation of the gaming reel. No other visual image within reel symbol 221*c* is predominant or can be seen at all at this time, and it is preferably apparent to a player or viewer watching this reel symbol in real time that a phasing or transitioning from the first image to the second is taking place. In one embodiment, this phasing or transitioning is relatively short and sharp, such that a more true "frame to frame" animation is perceived from the first visual image to the second. Such an effect can be achieved through more precise and higher quality lenticular processes and techniques in the creation of the original multi-image sheet.

In this particular phase shown in FIG. 5B, the gaming reel 141*c* can be in a stopped position, such as for the end of a bonus play or other game play. In the event that the gaming reel is stopped, reel symbol 221*c* might still show two visual images as predominant, such as during a transition or phase change from one to the next. More importantly for a stopped gaming reel, however, is that the reel symbol that matters most is the one at a pay line or location, such as central location 240. At this center pay line 240, the reel symbol is clearly that of a caught fish, which might indicate a bonus game win for a player having just played that bonus game. Although the reel symbol at a pertinent pay line or location might show more than one visual image or be involved in a transition, such as that which is happening for reel symbol 221*c* in this figure, it is thought to be preferable to design the reel symbols, strips and multi-image sheets such that only one visual image is predominant at an important or critical location such as a pay line. Alternatively, a reel symbol or reel stop such as 221*c* can be calculated as a "winner" when it winds up on a pay line or at a given location for all purposes regardless of any image that might actually perceived thereon. This result might be desirable given that some players might not stand directly in front of the gaming machine, and that other viewers watching the game play from a different viewing angle might not perceive the exact same visual image that the player does from within a given "winning" multi-image reel symbol.

Figure 5C:
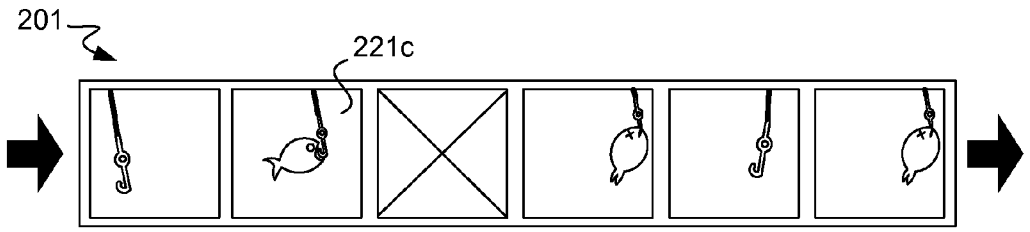
Figure 5D:
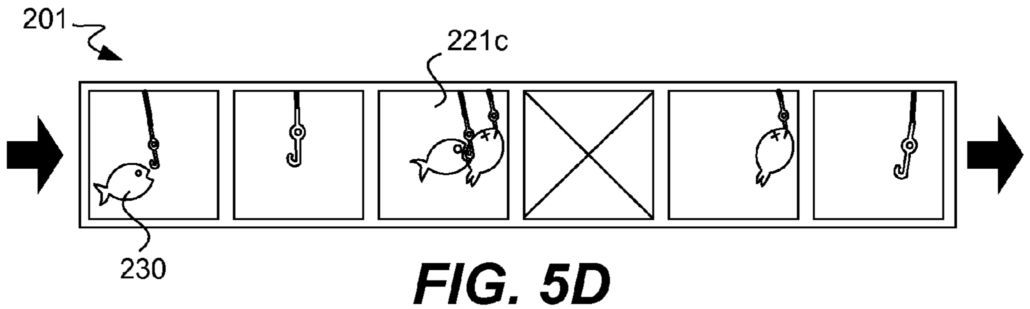

Continuing on to FIG. 5C, the gaming reel 141*c* having gaming strip 201 attached thereto has again rotated forward by the length of one-half of a reel symbol. At this point, it is clear that the second visual image 231 of the fish biting on the fishhook is predominant for reel symbol 221*c* as it progresses from left to right. Other reel symbols to the left and right of reel symbol 221*c* are also simultaneously progressing from left to right, with similar animations and phases or transitions from one visual image to another taking place in many or all of these other gaming reel symbols. At a subsequent animation phase shown in FIG. 5D, the gaming reel has moved forward by the length of a full reel symbol. At this stage, reel symbol 221*c* is again in transition, this time from the second visual image 231 to a third and final visual image 232, which shows a caught fish on the fishing line with a fishhook in its mouth. In comparison with FIG. 5B above, it can be seen that the transition over the next half-length of a reel symbol will completely phase out the second visual image 231 within reel symbol 221*c*, such that if the gaming reel were to stop again with this reel symbol at the pay line or center location 240, that only the final visual image 232 would be viewed by a player or viewer directly in front of the gaming machine.

Figure 5E:
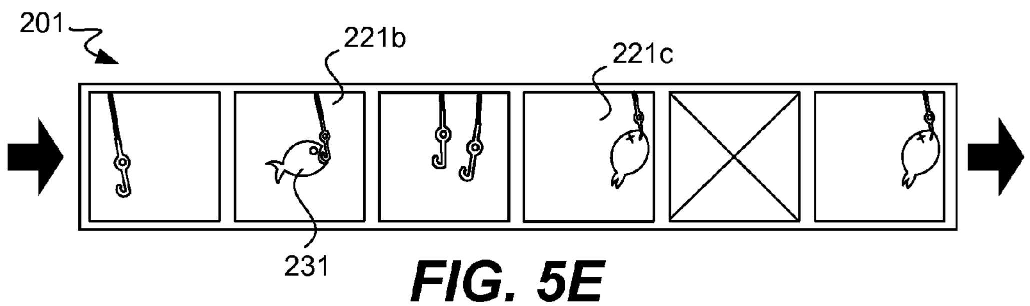

Moving on to FIG. 5E, the gaming reel 141*c* having gaming strip 201 attached thereto has again rotated forward by the length of a full reel symbol, and it is clear that the final visual image of a caught fish 232 is all that can be seen at this point within multi-image reel symbol 221*c*. As will be apparent, this will remain as the only visual image seen in this reel symbol as the symbol continues to the right and then disappears out of view. Of course, as this reel symbol rotates back around and enters the field of view again from the left, the predominant visual image will then be the first image 230 as shown in FIG. 5A, whereupon the entire three visual image sequence is repeated. As also indicated in FIG. 5E, the next fish reel symbol 221*b* that follows fish reel symbol 221*c* has already entered the field of view, and has also transitioned from its first visual image 230 in FIG. 5D to its second visual image 231 in FIG. 5E, similar to that which occurred for reel symbol 221*c*. This multi-image reel symbol 221*b* will similarly transition to its third visual image 232 by the time it reaches the position where reel symbol 221*c* is located in FIG. 5E.

As can also be seen, other reel symbols having multiple visual images can similarly go through several transitions, such as those that can be seen for the empty fishhook reel symbols. As in the case of the multi-image fish reel symbols, the multi-image empty fishhook reel symbols also go from a first visual image at the far left to a second visual image when they reach partway to the center pay line or location 240, and then to a third and final visual image when they reach this center pay line or location. The "X" or blank reel symbols or stops may similarly comprise multiple visual images, such as various water views, as noted above, with these multiple visual images or views also going through transitions as the reel symbols progress from left to right. Of course, any multi-image reel symbol can be made to animate or progress in similar fashion, regardless of the artwork or symbol type used. Additionally, more visual images might also be introduced, with transitions from one image to another also taking place between the center line and the far right of the gaming reel before the reel symbols disappear from view, as desired by a given designer or manufacturer. Such designs might involve five different visual images rather than three, as shown.

In other embodiments, a dozen or more different overlapping visual images might be contained in a single reel symbol, with many or all of these different images being prominent or visible at different viewing angles. In some embodiments, these multi-image reel symbols might essentially function independently of one another with respect to their changing visual images, such that any depth, motion or "animated" effects are independent within each reel symbol, with no deliberate coordination or pattern between reel symbols. In other embodiments, the location, direction and speed of moving reel symbols on different rotating gaming reels might be coordinated such that a noticeable pattern or overall effect is created. As in the specific example above, such an overall pattern or effect created by multiple multi-image reel symbols on multiple gaming reels might result in the perception of a horse race with several horses, a racetrack, a grandstand, and other items being represented in several reel symbols that are all coordinated to move with respect to each other in a predetermined pattern or fashion.

Other specific examples utilizing this technique might involve a ball, a car or another moving item that appears to move from a first gaming reel to a second gaming reel based upon transitions in multiple multi-image reel symbols. Such an apparent "jump" of an animated image from one gaming reel to another might then be followed by another jump to a third gaming reel, or a jump back to the originating first gaming reel, and so forth. Such "jumps" of "animated" visual images from one gaming reel to another can be also enhanced by implementing one or more "blank" images or spots within different individual multi-image reel symbols, such that no image or only a background image is left after the race horse, ball, car or other "animated" item within a series of coordinated reel symbols on multiple gaming reels has apparently jumped from one gaming reel to another.

As one specific example, three side-by-side vertically oriented gaming reels can be configured such that each aligns a multi-image reel symbol of a ping-pong ball side-by-side across all three gaming reels as the reels rotate together from top to bottom, as in a standard slot machine. During an initial upper portion of the visible downward rotation of these gaming reels, the ping-pong ball appears to move from left to right across the left gaming reel, while nothing exists at the corresponding horizontal locations of the other two gaming reels. Such movement across the left gaming reel might be in a three-frame sequence, as in the examples for the fish and empty fishhook reel symbols above. As the ping-pong ball finishes its final frame at the far right of its reel symbol on the left gaming reel, the next transition involves the reel symbol at the left gaming reel going blank or background only with no ball for the remainder of the visible downward rotation of the gaming reels, while the reel symbol on the middle gaming reel displays its first visual image of a ping-ping ball on its left side. Again, this ball travels across the middle gaming reel through two more transitions to other visual images in this reel symbol on the middle gaming reel while all three gaming reels rotate through a middle portion of their visible downward rotations. Finally, the reel symbol on the middle gaming reel transitions to a blank or background only image again, while the ping-pong ball appears for the first time on the corresponding multi-image reel symbol on the right gaming reel. Again, the ball transitions through two more visual images on this far right reel symbol during the lower portion of visible rotation, whereupon all three aligned reel symbols disappear from view. The end result is that the ball has been made to appear to go from the far left to the far right through an animation type technique.

Of course, the various visual images, viewing angles, reel alignments and rotational speeds of the various gaming reels all must be coordinated in a fairly strict manner to achieve the end result appearance of a single ping-pong ball traversing all three rotating gaming reels from the far left to the far right. As is well known in the visual arts, the human eye can be tricked into perceiving motion through frame type animation only at certain speeds, and it is contemplated herein that such ranges of speeds can be used in conjunction with rotating gaming reels to effect image "jumps" across gaming reels and other animated effects. Where even more overlapping images are imposed onto single multi-image reel symbols, a ping-pong ball or any other item, such as a car, horse, runner, football, baseball or the like can be made to appear to move back and forth across multiple gaming reels as they all rotate through their visible field of view. Alternatively, or in combination with the use of many more overlapping images per reel symbol, precise stepper controls can be applied to each individual gaming reel to alter rotational directions and speeds during a given play or spin of the reels, such that increased, slowed or reversed motions of moving or jumping images can be perfected. Of course such precise speeds and movements within a set of gaming reels can be controlled through a module, program, or set of modules or programs installed onto the MGC or another gaming machine processor, with appropriate modeling and testing being used to achieve a fluid end result.

In yet other embodiments, a lenticular process is used to implement visual images onto materials, such as one or more pliable plastic sheets, with these materials or sheets then being attached or otherwise placed at any number of locations within or about a gaming machine. As in the foregoing specific embodiments, any number of lenticular layers can be used in a given sheet or other material, from as few as two to as many as a dozen or more. The resulting effects of placing such materials, sheets or portions thereof within or about a gaming machine can be somewhat similar to those that are achieved in the foregoing examples, particularly where the items are attached to a movable base or other similar element. Alternatively, such items containing any artwork or other visual images implemented by a lenticular process can be used in a more static context on or within the gaming machine. The use of such materials on or within the gaming machine can include placement on or within an external cabinet, a top box, a diorama, a top glass, a belly glass, a belly door, various promotional and informational displays and panels, video screens, and assorted decal spots, as well as gaming reels, among other locations. Such locations may involve motion, may be static, or some combination thereof, as desired.

Figure 6:
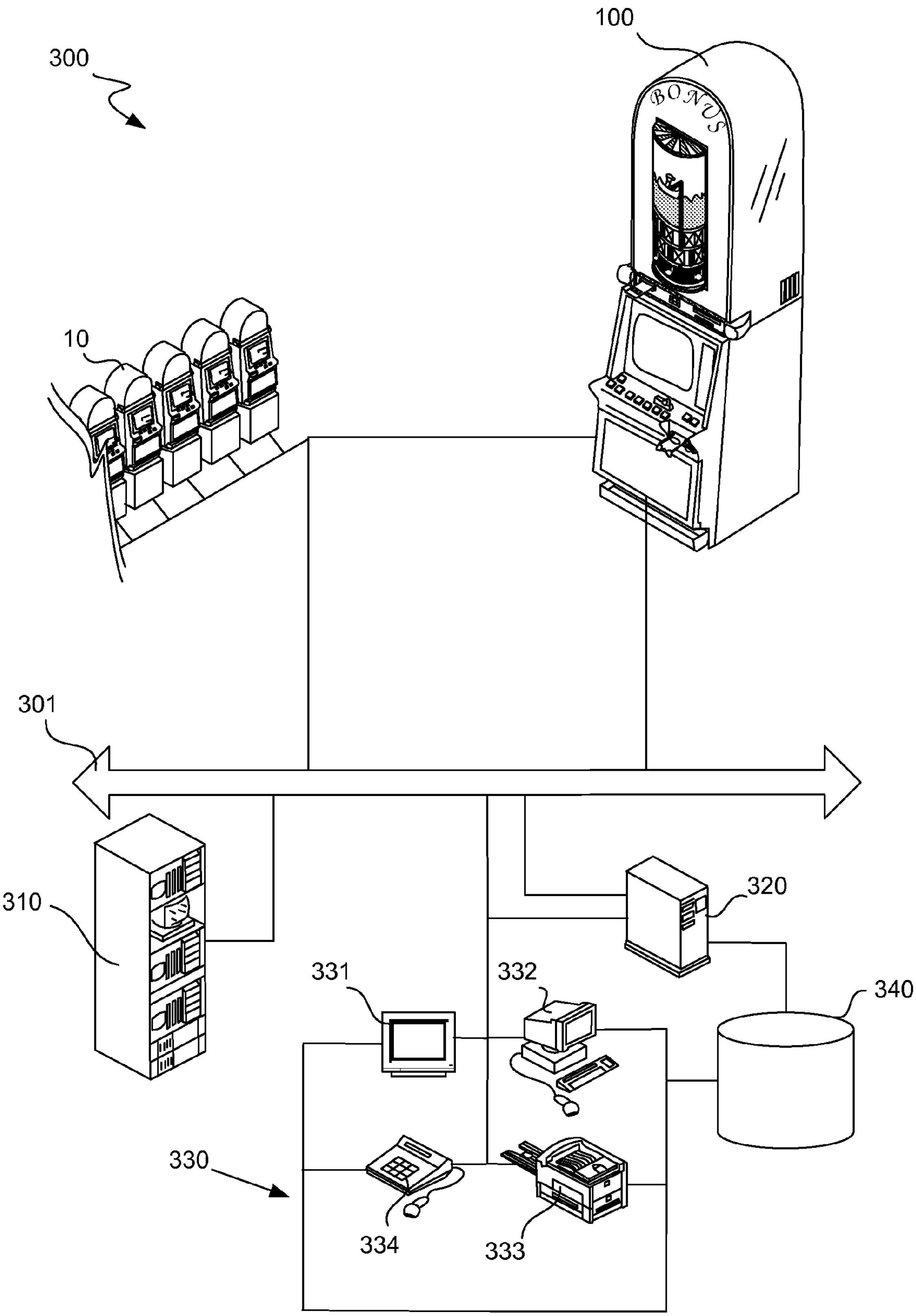
FIG. 6 illustrates a block diagram of an exemplary network infrastructure for providing various network components and a plurality of gaming machines such as the alternative gaming machine shown in FIG. 2.

Referring next to FIG. 6, a block diagram of an exemplary network infrastructure for providing various network components and a plurality of gaming machines such as the alternative gaming machine shown in FIG. 2 is illustrated. Gaming system 300 comprises several gaming machines, various communication items and a number of host-side components and devices adapted for use with a gaming environment and one or more gaming machines utilizing the inventive visual image display devices and methods disclosed herein. One or more gaming machines 10, 100 adapted for use in conjunction with gaming system 300 can be in a variety of locations, such as in banks on a casino floor, standing alone at a smaller independent establishment, or in isolation and not generally associated with any other gaming machines. These gaming machines may include one or more gaming machines 10 that do not utilize the inventive visual image display devices and methods disclosed herein, as well as one or more gaming machines 100 that do so.

Gaming machines 10, 100 and any other game play servers or devices adapted for use in gaming system 300 are preferably connected to a host-side network via any desired operable connection means, such as by direct wiring, dial-up, Bluetooth® or other wireless arrangements, or a connection to an Internet server or Internet service provider, for example. Such gaming machines and devices are preferably connected to a host-side gaming network via connection to common bus 301. This common bus 301 can also connect a number of other networked devices, such as, for example, a general-purpose server 310, one or more special-purpose servers 320, a sub-network of peripheral devices 330, and/or a database 340. Such a general-purpose server 310 may be already present within an establishment for one or more other purposes in lieu of or in addition to the provision of specialized features or functions in association with one or more gaming machines or gaming systems that implement the present invention. Functions for such a general-purpose server can include, for example, both general and game specific accounting functions, payroll functions, general Internet and e-mail capabilities, switchboard communications, and reservations and other hotel and restaurant operations, as well as other assorted general establishment record keeping and operations. In some instances, one or more specialized features or functions may also be associated with or performed by such a general-purpose server. For example, such a server may contain various server-based programs related to features or functions that administer or enhance the visual image displays and methods disclosed herein. This server may also be linked to one or more other gaming machines adapted for game play within an establishment, in some cases forming a network that includes all or substantially all of the gaming machines within that establishment. Communications can be exchanged from each adapted gaming machine to such programs or modules on the general-purpose server.

In another embodiment, gaming system 300 contains one or more special-purpose servers adapted to provide specialized features or functions in association with one or more gaming machines or gaming systems that implement the present invention. Such special-purpose servers can include, for example, a specialized gaming reel control server or program database, a specialized image or video presentation or file transfer server, and/or a specific game or downloadable game server, among others. Such additional special-purpose servers are desirable for a variety of reasons, such as, for example, to lessen the burden on an existing general-purpose server or to isolate or some or all visual image file information from the general-purpose server and thereby limit the possible modes of access to such files and information. Alternatively, gaming system 300 can be isolated from any other network within the establishment, such that a general-purpose server 310 is essentially impractical and unnecessary. Under either embodiment of an isolated or shared network, a special-purpose server 320 is preferably connected to sub-network 330. Peripheral devices in this sub-network may include, for example, one or more video displays 331, one or more user terminals 332, one or more printers 333, and one or more other digital input devices 334, such as a card reader or other security identifier, among others. Similarly, under either embodiment of an isolated or shared network, a special purpose server 320 or another similar component within a general-purpose server 310 also preferably includes a connection to a remote file database or other suitable storage medium 340. Database 340 is preferably adapted to store files containing data and information on various items, such as stored visual images, reel control algorithms, slot accounting, player accounting, player tracking, security, and/or other pertinent items, as desired.

Figure 7:
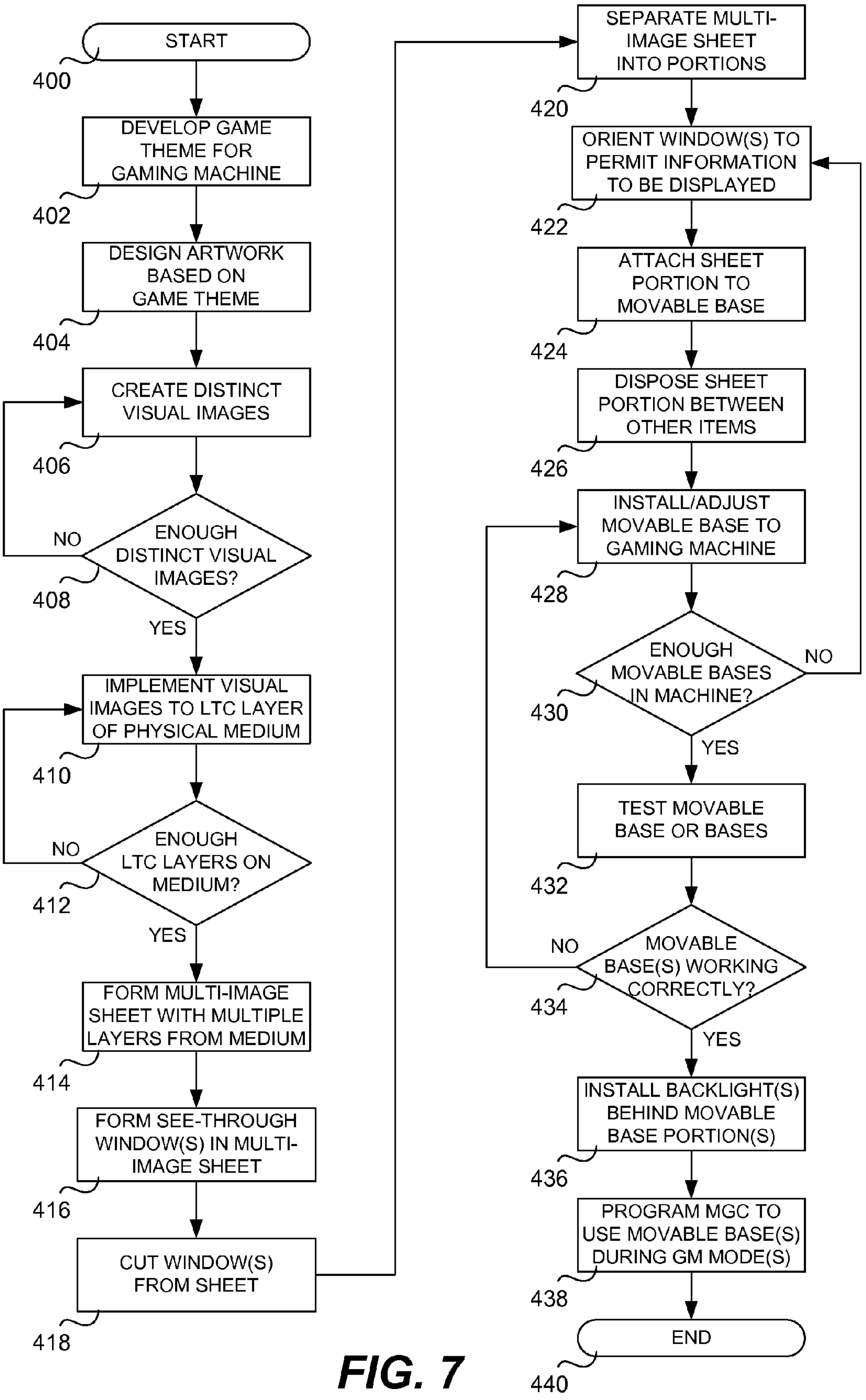
FIG. 7 illustrates a flowchart of one method of creating the gaming machine shown in FIG. 2 according to one embodiment of the present invention.

Turning now to FIG. 7, a flowchart of one method of creating a gaming machine having innovative visual images according to one embodiment of the present invention is provided. Such a machine can be the gaming machine 100 as illustrated in FIG. 2, a similar gaming machine, or any other gaming machine that utilizes visual images or displays having multiple overlapping images implemented by a lenticular process. It will be understood that this method is merely exemplary and illustrative in nature, such that some steps might be removed, others might be added, and the order or sequence of any steps or groups of steps might be altered. After an initial start step 400, the method begins with a process step 402, where a game theme is developed for the gaming machine being created. Such a gaming theme can be based on a wide variety of things, such as sporting events, news items, celebrities, literary characters, movies, television or radio shows, other media events or personalities and/or various types of games or game variations, among others. Specific examples of such game themes can include, for example, Megabucks®, Wheel of Fortune®, Star Wars®, Drew Carey®, and Triple Play Poker™, among many others.

After (or while) a game theme is developed, artwork is designed based on this game theme at a process step 404. Such artwork can be for numerous purposes, including for placement on or within the gaming machine itself, as well as for promotional materials, if desired. Placement on or within the gaming machine can include placing this artwork on an external cabinet, a top glass, a belly glass, various promotional and informational displays, video screens, and gaming reels, among other locations. At the next process step 406, distinct visual images are created, which may be a part of the designing artwork of step 404, depending upon a given situation. At a subsequent decision step 408, an inquiry is made as to whether there are enough distinct visual images, with a loop reverting back to step 406 until there are enough such images. In the event that there are enough distinct visual images, then the method continues to process step 410. In particular, it is contemplated that a large number of distinct visual images will be desired or necessary where numerous multi-image regions or reel symbols are being created for the gaming machine. Of course, it should again be remembered that the illustrated method is not so strict so as to prevent a different order or reversion of steps. Accordingly there is no prohibition against the creation of additional distinct visual images much later in the process where it is determined that such additional images might be beneficial or necessary.

At the next process step 410, at least some of the distinct visual images are implemented to a physical medium via a lenticular process. Such a lenticular process can be selected from any suitable lenticular process, such as lithographic, silkscreen, digital, and photographic processes. It is preferable that all distinct visual images for each lenticular layer of the physical medium be implemented before moving on to the next lenticular layer on that medium, as will be readily appreciated. In addition, it is preferable that the physical medium be flat during the implementation process, for a more clear and reliable placement of the various visual images. Because the physical medium will be applied to curved, substantially curved or other non-flat surfaces in some cases, it is also preferable that this medium be sufficiently pliable or flexible. Various types and forms of plastic are most suitable for this purpose.

In order for motion or other frame style animation effects to be perceived by a player or viewer of the gaming machine, it is also preferable that at least some of these distinct visual images also be implemented as overlapping one another. This can be done in one specific region, and is preferably done in many regions, with one or more of these regions preferably being designed as reel symbols and/or reel stops in an application where the medium is to be separated into reel strips and attached to one or more gaming reels. When implemented in overlapping fashion on different lenticular layers, such images within the same region are preferably adapted such that one visual image is visually predominant at one viewing angle, while another distinct visual image is visually predominant at another viewing angle that is different from the first viewing angle. Thus, when the viewing angle of such a specific region of overlapping images changes by an appropriate amount during viewing, the visual image that is dominant or even seen at that angle can also change accordingly. The actual way that the viewing angle changes can be accomplished by movement of the physical medium displaying the image, movement of the player or viewer outside the gaming machine, or some combination of both, as will be readily appreciated.

At a subsequent decision step 412, an inquiry is made as to whether there are enough lenticular layers on the physical medium. If there are not enough layers to satisfy the given design requirements, then the process reverts to step 410, where visual images are implemented to another lenticular layer of the physical medium. This loop repeats until the desired number of lenticular layers have been created, at which point the method continues to process step 414. At a minimum, there should be at least two lenticular layers in order to create some form of three-dimensional effect or perception. As noted above, any number of lenticular layers can be created, although the return on increased visual effects will likely get smaller with each new layer, while manufacturing costs continue to rise. Accordingly, it is thought that five lenticular layers is a suitable number of layers for such a process. Again, more layers can certainly be used, especially where more complex visual effects are desired.

At process step 414, a multi-image sheet is formed from the physical medium, with the sheet preferably having the same number of lenticular layers as formed in the medium. In one embodiment, steps 410 and 412 form this sheet as set forth in step 414. In another embodiment, this multi-image sheet is formed from the physical medium, such as by cutting or otherwise separating the sheet from a larger medium that is worked on during a large scale manufacturing process. At a following process step 416, one or more transparent or translucent windows are formed in the multi-image sheet. Such a step may involve removing material implemented onto the sheet in the previous steps. In another embodiment, the implementation process from steps 410 and 412 may have been specifically performed such that no ink or other materials were deposited onto certain desired "window" areas of the medium, such that step 414 has already been automatically incorporated into the preceding steps. The purpose for forming one or more such windows, if done, is to create an area where a display might be readable therethrough. This is particularly useful in the event that a meter such as a spectrometer, a credit meter, a jackpot meter or any other gaming machine type meter should be readable through an applied portion of the multi-image sheet. Although such applied portions might be static in nature, they may also be applied to movable parts within or about the gaming machine, such as, for example, gaming reels, as described below in greater detail.

In any event, the window or windows are preferably cut from the sheet at the following process step 418. Such a cutting process might involve the use of a laser as a cutting tool for a more precise cut in the plastic or other physical medium, as will be readily appreciated. In some embodiments, particularly where the windows are fully transparent, this cutting step 418 may be unnecessary. In other embodiments where the cutting step is to be performed regardless, thereby removing the plastic or other physical medium material within the window or windows, the step of forming one or more see-through windows at process step 416 might be unnecessary. In such cases, simply noting where the material is to be cut would be sufficient. After any desired windows are formed and/or cut, the method then moves to process step 420, where the multi-image sheet is formed into portions, if necessary. In many instances, the multi-image sheet can be too large to apply as intended, such as to a gaming reel, display or other surface of the gaming machine, such that the sheet must be cut or otherwise separated into ready-to-apply portions, sections or strips. In one particular embodiment, the multi-image sheet comprises a plurality of gaming reel strips, such that step 420 results in the sheet being cut or separated into individual reel strips.

At a subsequent process step 422, any existing windows on a given sheet portion are oriented to a proper position such that a meter or other information can be displayed therethrough, and the sheet portion is then attached to a movable base at process step 424. Such a base can be a movable platform, sign, display or other gaming machine component that is designed to be movable with respect to some other portion of the gaming machine. In one embodiment, this movable base can be a cylindrical object that is adapted to be rotatable about an axis, with a specific example being that of a gaming reel adapted for play in a "slots" type of game. The process used for attaching the appropriately sized sheet portion to the movable base can be any of a number of suitable processes, and can be fully or partially automated, as well as fully manual. The actual attachment means can also be any of a number of means, such as, for example, welds, staples, rivets, nails, glue, tape, press fits and the like. In one particular embodiment, attachment of the sheet portion to the movable base can be accomplished by using VHB tape, such as that which is typically done in the case of affixing a reel strip to a gaming reel, as will be readily understood.

Moving next to process step 426, the sheet portion is disposed between other items, such as between the movable base and a cover item. Such a cover item can be a piece of glass or plastic, or any other item suitable for protecting the sheet portion and/or holding it in place. In some embodiments, it may be preferable to perform step 426 prior to step 424, such as in the case of sandwiching a reel strip between two thin pieces of glass prior to attachment to the gaming reel. In other embodiments, the gaming reel itself might comprise one such item, while a cover piece of glass or plastic is placed over the top of the sheet portion or reel strip, such that it hence becomes disposed between other items. After the sheet portion has been disposed between other items and/or attached to the movable base, the movable base is then installed within or about the gaming machine at process step 428.

In the event that the movable base is a gaming reel, the reel is installed and adjusted, as would be the case for a typical gaming reel. Such an installation can be within or about the top box of a gaming machine, as in the examples above, and/or can also be within or about a main cabinet of the gaming machine, as desired. In the case of gaming reels, such "movable base" reels can be adapted to rotate about any axis with respect to the gaming machine. Although the gaming reels of many gaming machines are typically adapted to rotate about a horizontal axis with respect to the gaming machine, such as in a typical game of mechanical "slots," such gaming reels can also be adapted to rotate about a vertical axis, such as in the illustrated examples discussed above. Any other axis with respect to the gaming machine can be adapted as well, such as a 45-degree axis, an orthogonal axis, or a combination thereof. Other gaming machine locations might also be suitable for such a movable base installation, such as atop the top box or gaming machine in an attractive display.

Continuing on to decision step 430, an inquiry is made as to whether there are enough movable bases in the gaming machine as designed or desired. If not, then the method reverts to process step 422, where steps 422 through 430 are repeated for the next movable base. In one example where the movable bases comprise a number of gaming reels, then the process repeats for each such gaming reel. For example, for a gaming machine having three gaming reels and no other movable bases, steps 422 through 430 are performed three times. Once all of the gaming reels or movable bases are installed into the gaming machine, the method then continues to process step 432, where the movable base or bases are then tested for proper operation. Of course, it is possible to test or partially test each individual movable base or gaming reel as it is installed, if desired. It is thought, however, that it might be more efficient to test all such gaming reels or movable bases at once. Such testing after all gaming reels are installed is particularly desirable in the event that one or more of the gaming reels are intended to have cooperative effects when operated together, as noted above.

At decision step 434 an inquiry is made as to whether the movable base or bases are working correctly. If not, then the process reverts to process step 428, so that adjustments can be made. When every movable base is working correctly, the method then continues to process step 436, where one or more backlights are installed behind at least a portion of one or more of the movable bases. This is particularly important where see-through illumination of one or more of the visual images is desired, such as in the case of multi-image reel symbols. In such instances, it is preferable that at least a portion of the movable base or gaming reel be transparent or translucent, and that one or more of the visual images or reel symbols on the sheet portion or gaming reel be so as well. Of course, step 436 is not absolutely necessary, and might be performed at some other time in this detailed process. Similarly, final process step 438 might also be omitted or performed at some other time in the method illustrated herein, as desired by a given gaming machine designer or manufacturer.

Process step 438 involves programming the MGC or some other gaming machine processor, as appropriate, to utilize one or more of the movable bases during various gaming machine modes. For example, during a period of gaming machine inactivity, such as during an "attract mode," the MGC or other appropriate gaming machine processor can be adapted to use the movable base or bases as part of a display feature intended to lure or attract players, such attract modes being generally known in the art. As another example, the MGC or other controller or processor can be programmed to use one or more movable bases as part of a regular game or bonus game on the gaming machine. An obvious instance of this would be in the case where the movable bases comprise a plurality of gaming reels, and the MGC has been programmed to play a game and then control operation of these gaming reels to show or display the result of that game. Of course, many other possibilities exist as well, such as where a movable base is not a gaming reel, but some other display portion, such as a vertical platform within a top box diorama. Movement of such a platform within this other display portion might consist of all or some portion of an attract feature or main or bonus game, with the overlapping visual images appearing to change form during the movement of the platform, thereby providing an attractive visual effect as part of the attract feature or game. After the MGC or other controller has been appropriately programmed, the method ultimately ends at an end step 440.

Figure 8:
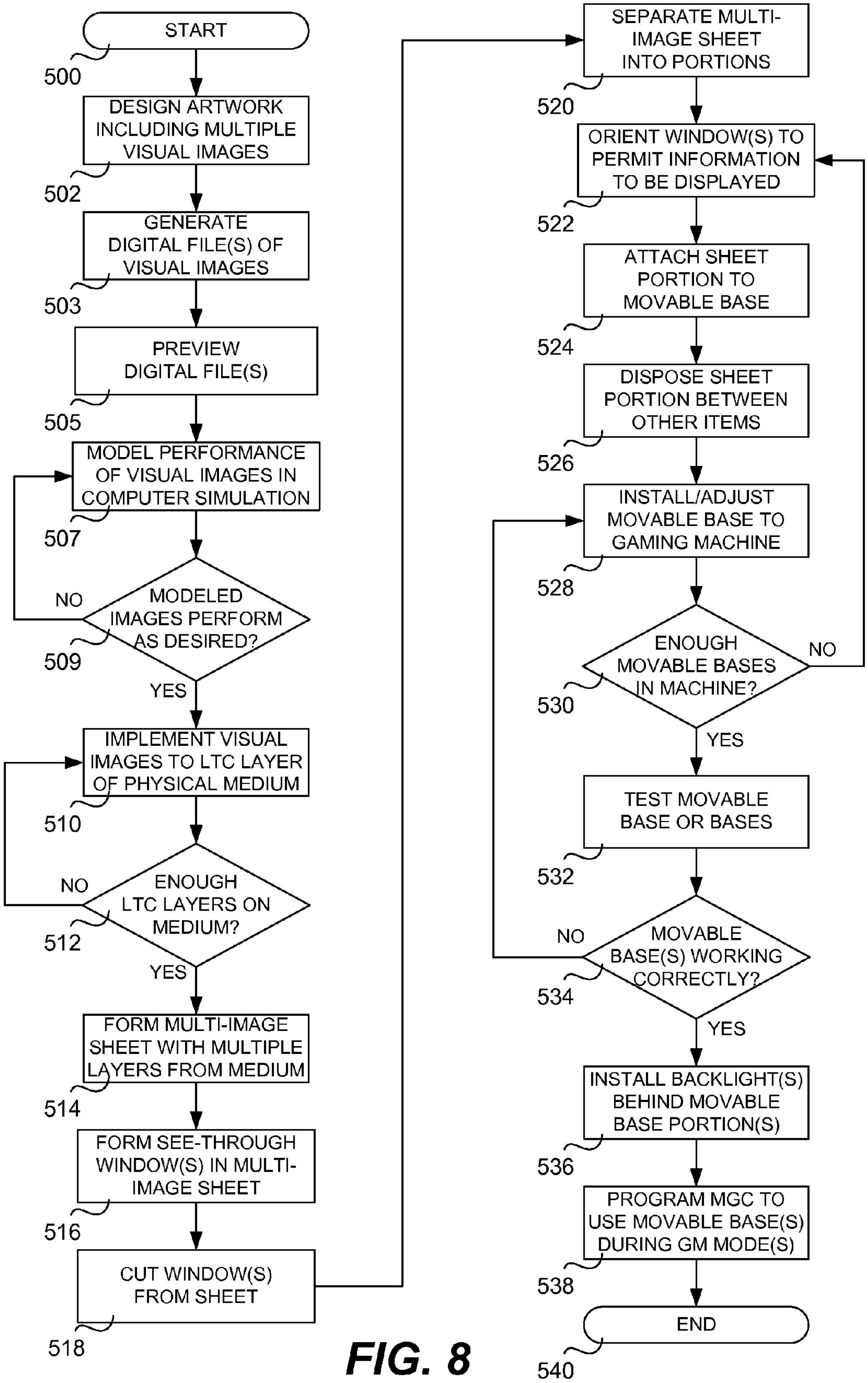
FIG. 8 illustrates a flowchart of one method of developing the gaming machine shown in FIG. 2 according to one embodiment of the present invention.

Moving on to FIG. 8, a flowchart of one method of developing a gaming machine such as that which is shown in FIG. 2 according to one embodiment of the present invention is shown. As in the foregoing example, it will again be understood that this method is merely exemplary and illustrative in nature, such that some steps might be removed, others added, and the order or sequence of any steps or groups of steps might be altered. In addition, it will be readily appreciated that the method of developing a gaming machine as illustrated herein is substantially similar in many respects to the method of creating a gaming machine discussed above. In fact, it is specifically contemplated that the two methods might be combined to form a more detailed and comprehensive method of creating and/or developing a gaming machine, as desired by a given gaming machine developer or manufacturer.

After an initial start step 500, the method begins with a process step 502, where artwork is designed for the gaming machine, with this artwork including multiple visual images. In one embodiment, this process step 502 of designing artwork is identical or substantially similar to process steps 404 through 408 of the foregoing example of creating a gaming machine. Although the step of developing a game theme is not included herein, it will be readily appreciated that such a step might also be included in the development of a gaming machine. After the artwork, including visual images, has been designed, the method continues to a process step 503, where one or more digital files of at least a portion of these visual images are generated. Such a step can be performed on a computer or computer system with one or more appropriate design software programs, such as, for example, Autocad, Visio, Adobe Illustrator, Adobe Photoshop, Magic Interlace, 3d Magic and 3DZ, among others, the use of any of which will be readily understood by those skilled in the art.

At a subsequent process step 505, the digital file or files created above are previewed for reasons such as accuracy, artistic integrity, visual effect and process adaptability, among others. Of course, some images may be previewed before and/or after others are designed or created, and it is not critical that steps 502 and 503 be fully completed before step 505 begins in all cases. Similarly, process step 507 and inquiry step 509 as described below might also begin and recur while steps 502 through 505 are partially finished or in progress, and this can be particularly relevant where a team or several different persons are working together to accomplish the disclosed method, as will be readily appreciated.

At process step 507, one or more of the visual images selected from the plurality of designed visual images are modeled. This can be accomplished during a computer-assisted simulation to estimate the appearance of one or more of the modeled images after a real application, such as to a gaming strip applied to a rotating gaming reel. One or more various computer software programs can be used to assist in this process of modeling visual images in various particular applications, with such programs including, for example, 3DZ and Alibre Design software, among others, the use of which will be readily appreciated by those skilled in the art. In some embodiments, this computer-assisted modeling process might involve the use of physical models or prototypes to help visualize and determine how certain images, combinations of images and various configurations might be perceived. In such embodiments, the computer assistance might simply involve the manipulation and/or production of actual visual images, with projected results being observed from the physical models or prototypes. In other embodiments, the modeling process can be entirely virtual, as rendered on a computer or computer system. Of course, any combination of purely physical and purely virtual processes is also possible.

At a subsequent decision step 509, an inquiry is made as to whether the modeled image or images have performed as anticipated or desired. If not, then various parameters can be reset or altered and more modeling can be undertaken, as the method reverts back to process step 507. In some instances, further design, file generation and/or file review work might be desired, in which case the method would revert to the appropriate process step or steps. In the event that all modeled visual images have been determined to perform as desired, however, then the method moves on to process step 510, where the successfully designed and modeled visual images are implemented onto a lenticular layer of a physical medium. As in the foregoing example discussed above, this process can be repeated layer by layer in steps 510 and 512 until the desired number of lenticular layers have been created on the physical medium, which again can be plastic or some other suitable material.

As also in the foregoing example, the multi-image sheet or sheets formed from this physical medium can contain a plurality of images that appear to be three-dimensional in nature when viewed without movement from a single stationary viewing location and viewing angle. Features such as depth can be perceived even where the sheet, image and viewer all remain stationary, and other features such as movement, "morphing" or other "frame-by-frame" animation effects can be perceived where the sheet or image is moved with respect to the viewer. By morphing, it is meant that an image can appear to change from one item to another via the same type of "frame" animation as used to simulate motion. While a morphed image might also be made to appear as if it is in motion, such motion is not ultimately necessary. In one particular example, a morphed image might involve an image of a boy changing into that of an old man through several intermediary step images. Many other types of applications are also possible, as will be readily appreciated.

Of course, these same effects can also be perceived where the viewer moves and the sheet and image remain stationary, since the critical element that is the viewing angle between the viewer and image is changed. This can occur whenever the sheet/image moves, whenever the viewer moves, or both, such that the viewing angle can change even though one or the other might remain stationary. In a specific embodiment, it is contemplated that the movable base to which the multi-image sheet or sheet portion is attached should move, such that the player or viewer can perceive a moving or morphing effect of the image without having to move himself or herself. It is noted at this point that steps 510 through 540 are identical or substantially similar to steps 410 through 440 of the foregoing embodiment shown in FIG. 7 and described above. The foregoing description of steps 410 through 440 is thus incorporated and applied to steps 510 through 540 here. Of course, as noted above, some steps may be omitted, other steps may be added, and the exact step sequence may be reordered.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming machine adapted for accepting a wager, playing a game based on the wager and granting a payout based on the result of the game, comprising:

an exterior housing arranged to contain a plurality of internal gaming machine components therein;

a gaming controller in communication with at least one of said plurality of internal gaming machine components and adapted to control one or more aspects of said game; and a display region located within or about said exterior housing and adapted to present a plurality of gaming reels including at least a first gaming reel and a second gaming reel, said plurality of gaming reels being controlled at least in part by said gaming controller, wherein said gaming controller controls the presentation of said plurality of gaming reels such that a first reel symbol moves or appears to move from said first gaming reel to said second gaming reel while within said display region such that an animation effect is created, wherein said animation effect includes coordinating various visual images, viewing angles, reel alignments and rotational speeds of said plurality of gaming reels in a manner such that said first reel symbol appears on the first gaming reel for a set duration of time or frame sequence and on the second reel at the conclusion of said set duration of time or frame sequence.

2. The gaming machine of claim 1, wherein at least one of said plurality of gaming reels rotates about an axis that is substantially parallel to a vertical axis of the gaming machine.

3. The gaming machine of claim 1, wherein at least one of said plurality of gaming reels rotates about an axis that is substantially perpendicular to a vertical axis of the gaming machine.

4. The gaming machine of claim 1, wherein said first reel symbol moves or appears to move from said first gaming reel to said second gaming reel during the play of a wager-based game on said gaming machine.

5. The gaming machine of claim 1, wherein said first reel symbol moves or appears to move from said first gaming reel to said second gaming reel while said first and second gaming reels are rotating.

6. The gaming machine of claim 1, wherein said first reel symbol moves or appears to move from said first gaming reel to said second gaming reel due to the effects of lenticular images used to depict said first reel symbol.

7. The gaming machine of claim 1, wherein said gaming controller further controls the presentation of said plurality of gaming reels such that a second reel symbol moves or appears to move from one of said plurality of gaming reels to another of said plurality of gaming reels while within said display region.

8. A method of presenting gaming reels on a wager-based gaming machine, comprising:

displaying at a display region of said wager-based gaming machine a plurality of gaming reels in a first set of static, non-spinning positions, said plurality of gaming reels including a first gaming reel and a second gaming reel;

accepting a monetary value wager from a player;

accepting a game-related input from said player;

initiating the play of a wager-based game as a result of said game-related input;

presenting at said display region said plurality of gaming reels in a rotating motion as a part of the display of said wager-based game; and showing a first reel symbol that moves or appears to move from said first gaming reel to said second gaming reel while within said display region such that an animation effect is created, wherein said animation effect includes coordinating various visual images, viewing angles, reel alignments and rotational speeds of said plurality of gaming reels in a manner such that said first reel symbol appears on the first gaming reel for a set duration of time or frame sequence and on the second reel at the conclusion of said set duration of time or frame sequence.

9. The method of claim 8, wherein at least one of said plurality of gaming reels rotates about an axis that is substantially parallel to a vertical axis of the gaming machine.

10. The method of claim 8, wherein at least one of said plurality of gaming reels rotates about an axis that is substantially perpendicular to a vertical axis of the gaming machine.

11. The method of claim 8, wherein said first reel symbol moves or appears to move from said first gaming reel to said second gaming reel during the play of said wager-based game on said gaming machine.

12. The method of claim 8, wherein said first reel symbol moves or appears to move from said first gaming reel to said second gaming reel while said first and second gaming reels are rotating.

13. The method of claim 8, wherein said first reel symbol moves or appears to move from said first gaming reel to said second gaming reel due to the effects of lenticular images used to depict said first reel symbol.

14. The method of claim 8, further including the step of:

showing a second reel symbol that moves or appears to move from one of said plurality of gaming reels to another of said plurality of gaming reels while within said display region.

15. The method of claim 8, further including the steps of:

determining an outcome of said wager-based game; and granting a monetary award to said player based on said game outcome.

16. A wager-based, reel-type gaming machine, comprising:

an exterior housing arranged to contain a plurality of internal gaming machine components therein;

a master gaming controller in communication with at least one of said plurality of internal gaming machine components and adapted to control one or more aspects of said game; and a plurality of gaming reels adapted to be controlled at least in part by said master gaming controller and having a plurality of reel symbols disposed thereupon, wherein said master gaming controller controls the presentation of said plurality of gaming reels such that a first reel symbol moves or appears to move from one of said plurality of gaming reels to another of said plurality of gaming reels such that an animation effect is created, wherein said animation effect includes coordinating various visual images, viewing angles, reel alignments and rotational speeds of said plurality of gaming reels in a manner such that said first reel symbol appears on the first gaming reel for a set duration of time or frame sequence and on the second reel at the conclusion of said set duration of time or frame sequence.

17. The wager-based, reel-type gaming machine of claim 16, wherein said first reel symbol moves or appears to move from said first gaming reel to said second gaming reel during the play of a wager-based game on said gaming machine.

18. The wager-based, reel-type gaming machine of claim 16, wherein said first reel symbol moves or appears to move from said first gaming reel to said second gaming reel while said first and second gaming reels are rotating.

19. The wager-based, reel-type gaming machine of claim 16, wherein said first reel symbol moves or appears to move from said first gaming reel to said second gaming reel due to the effects of lenticular images used to depict said first reel symbol.

20. The wager-based, reel-type gaming machine of claim 16, wherein said master gaming controller further controls the presentation of said plurality of gaming reels such that a second reel symbol moves or appears to move from one of said plurality of gaming reels to another of said plurality of gaming reels.

* * * * *